(12) United States Patent
Yamamoto et al.

(10) Patent No.: US 7,483,021 B2
(45) Date of Patent: Jan. 27, 2009

(54) DRIVE CONTROL CIRCUIT, EMISSION CONTROL CIRCUIT, COMMUNICATION APPARATUS AND DRIVE CONTROL METHOD

(75) Inventors: Isao Yamamoto, Kyoto (JP); Tomoyuki Ito, Kyoto (JP); Hiroyuki Iwaki, Kyoto (JP)

(73) Assignee: Rohm Co., Ltd. (JP)

( * ) Notice: Subject to any disclaimer, the term of this patent is extended or adjusted under 35 U.S.C. 154(b) by 608 days.

(21) Appl. No.: 11/068,103

(22) Filed: Feb. 28, 2005

(65) Prior Publication Data

US 2005/0202851 A1    Sep. 15, 2005

(30) Foreign Application Priority Data

Feb. 27, 2004   (JP)   ............... 2004-055373
Feb. 4, 2005    (JP)   ............... 2005-029757

(51) Int. Cl.
*G09G 3/36*   (2006.01)

(52) U.S. Cl. .............. 345/204; 345/1.1; 345/84; 345/95; 345/210; 345/214; 345/690

(58) Field of Classification Search ........... 345/87–100, 345/204, 1.1, 84, 210, 214, 690
See application file for complete search history.

(56) References Cited

U.S. PATENT DOCUMENTS

| 5,818,419 | A | * | 10/1998 | Tajima et al. | ............... 345/691 |
| 6,717,562 | B2 | * | 4/2004 | Sandoe et al. | ................ 345/92 |
| 7,012,600 | B2 | * | 3/2006 | Zehner et al. | .............. 345/214 |
| 7,256,552 | B2 | * | 8/2007 | Ishii et al. | ............... 315/169.2 |

FOREIGN PATENT DOCUMENTS

JP    2002-111786    4/2002

* cited by examiner

*Primary Examiner*—Bipin Shalwala
*Assistant Examiner*—Vince E Kovalick
(74) *Attorney, Agent, or Firm*—Cantor Colburn LLP

(57) ABSTRACT

A drive control circuit sends out pulse signals of various pulse signals so as to control the light emission amount and luminance of LEDs by gradually increasing and decreasing the pulse width in predetermined cycles during predetermined periods based on parameters supplied from an LED drive controller that determine a first emission control processing period, a second emission control processing period, first to fourth slope periods and the like. The tone of an emitted color realized by a plurality of LEDs is controlled by synchronizing the periods of time of light emission control processings.

18 Claims, 13 Drawing Sheets

FIG.6A

| $X_1$ | $Y_1$ | $Z_1$ | OUTPUT |
|---|---|---|---|
| 0 | 0 | 1 | A |
| 1 | 0 | 1 | B |
| 0 | 1 | 1 | 0 |
| 1 | 1 | 1 | 0 |
| 0 | 0 | 0 | 0 |
| 1 | 0 | 0 | 0 |
| 0 | 1 | 0 | 0 |
| 1 | 1 | 0 | 0 |

FIG.6B

| $X_2$ | $Y_2$ | $Z_2$ | OUTPUT |
|---|---|---|---|
| 0 | 0 | 1 | C |
| 1 | 0 | 1 | D |
| 0 | 1 | 1 | 0 |
| 1 | 1 | 1 | 0 |
| 0 | 0 | 0 | 0 |
| 1 | 0 | 0 | 0 |
| 0 | 1 | 0 | 0 |
| 1 | 1 | 0 | 0 |

DRIVE CONTROL CIRCUIT, EMISSION CONTROL CIRCUIT, COMMUNICATION APPARATUS AND DRIVE CONTROL METHOD

BACKGROUND OF THE INVENTION

1. Field of the Invention

The present invention relates to a drive control circuit, an emission control circuit utilizing the drive control circuit, a communication apparatus provided with the emission control circuit and a drive control method, and it particularly relates to a technology by which to drive and control a load using the pulse-width modulation.

2. Description of the Related Art

Battery-driven type mobile devices, such as cellular phones or PDAs (Personal Digital Assistants) use LED (Light-Emitting Diode) devices for various purposes, such as a backlight of an LCD (Liquid Crystal Display), a flash for an attached CCD (Charge-coupled device) camera or blinking of LED elements with different emission colors. Reference (1) in the following Related Art List, for instance, discloses a system in which various colors are emitted by mixing blue, green and red emitted by their respective LED elements. Since the emission of light by LED elements is carried out by a pulse-width modulation (PWM) scheme, the three LED elements are connected to their respective PWM circuits via three output-stage transistors.

The drain, source and gate of an output-stage transistor are coupled to the cathode, reference voltage and PWM circuit of an LED element, respectively. And the LED element will emit light when a pulse signal outputted from the PWM circuit goes high and the output-stage transistor turns on. The longer the period in which the pulse signal is high, the more the light emission amount of the LED element will be. On the other hand, the emission of various other color lights than blue, green and red is accomplished by varying the light emission amounts of the LED elements through control of the respective duty ratios of the pulse signals to be outputted from the three PWM circuits.

RELATED ART LIST (1) Japanese Patent Application Laid-Open No. 2002-111786.

As described above, the system introduced in Reference (1) is such that the duty ratio of a pulse signal outputted from one PWM circuit or the duty ratios of pulse signals outputted from a plurality of PWM circuits are controlled to adjust the light emission amount of an LED element or various color tones to be realized by the light emission from a plurality of LED elements. The duty ratio of such a pulse signal is controlled by a comparison in magnitude between a sawtooth-waveform signal outputted from an oscillation circuit and a threshold value, and when an LED element is driven to emit light gradually, for instance, a threshold value whose setting is changed as appropriate to obtain a desired duty ratio is inputted to a PWM circuit each time. According to this structure, a desired duty ratio may be obtained, but an oscillation circuit is always required to generate a pulse signal, which is a hindrance to any attempts at miniaturization of such a system. Moreover, it is desired that the complex control of the light emission amount and luminance of the LED elements or the color tone to be realized by a plurality of LED elements, including the generation of pulse signals, be made relatively easier and more flexible.

SUMMARY OF THE INVENTION

The present invention has been made in view of the foregoing circumstances and to solve the aforementioned problems, and an object thereof is to provide a drive control method capable of controlling a load with relative ease and flexibility and to provide a compact drive control circuit, an emission control circuit and a communication apparatus to realize said method.

A preferred embodiment according to the present invention relates to a drive control circuit comprises: an initial-value setting circuit which sets an initial value of pulse width when a load is driven using pulse-width modulation; a time setting circuit which sets a period of an equal pulse width; and a slope control circuit which varies the pulse width gradually in units of minimum modulation every time the period elapses from the beginning of driving the load. The period may be set by a multiple of cycle of the pulse width modulation. According to this mode of carrying out the invention, the initial value of pulse width and the period of an equal pulse width are set, so that the pulse width can be varied gradually by varying the pulse width in units of minimum modulation every time the period elapses from the beginning of driving the load. As a result, a drive control circuit which is simply and conveniently structured and is also highly flexible can be provided.

A drive control circuit according to this mode may further comprise a total time setting circuit which sets a period of time during which the pulse width varies. Where the period of time during which the pulse width varies is set as a unit control cycle, the drive control circuit may further comprise a sequence control unit which controls and determines whether or not to carry out an emission control processing for varying the pulse width, per the unit control cycle.

Another preferred embodiment according to the present invention relates to an emission control circuit. This emission control circuit comprises: a plurality of light emitting elements; a drive circuit which drives respectively the light emitting elements by pulse width modulation; an initial-value setting circuit which sets initial values of pulse width in the pulse width modulation to the light emitting elements, respectively; a time setting circuit which sets a period of an equal pulse width to the respective light emitting elements; and a slope control circuit which varies the pulse width gradually in units of minimum modulation for each of the light emitting elements every time a period which is set for each of the light emitting elements elapses from the beginning of driving the each of the light emitting elements. According to this mode of carrying out the invention, the initial value of pulse width and the period of an equal pulse width are set for each of the plurality of light emitting elements, so that the pulse width can be varied gradually by varying the pulse width in units of minimum modulation every time the period elapses from the beginning of driving the load. As a result, a drive control circuit with relative ease and flexibility can be provided.

Still another preferred embodiment according to the present invention relates to a communication apparatus. This communication apparatus is provided with the above-described emission control circuit. Still another preferred embodiment according to the present invention relates to a drive control method. In this method, when a load is driven using pulse width modulation, a drive having a slope with respect to time is realized in a manner such that a unit variation of pulse width is fixed and a period of an equal pulse width is variably set.

Still another preferred embodiment according to the present invention relates also to a drive control method. This method is such that when a plurality of loads are respectively driven using pulse width modulation, a drive by pulse width that changes with time independently of the plurality of loads is carried out whereas a drive for the plurality of loads is synchronized as a whole in a manner such that a cycle common to the plurality of loads is provided.

It is to be noted that any arbitrary combination of the above-described structural components and expressions changed among a method, an apparatus, a system, a computer program, a recording medium and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 6A is a truth table of inputs and outputs of signals at a first selector; and FIG. 6B is a truth table of inputs and outputs of signals at a second selector.

DETAILED DESCRIPTION OF THE INVENTION

Figure 1:
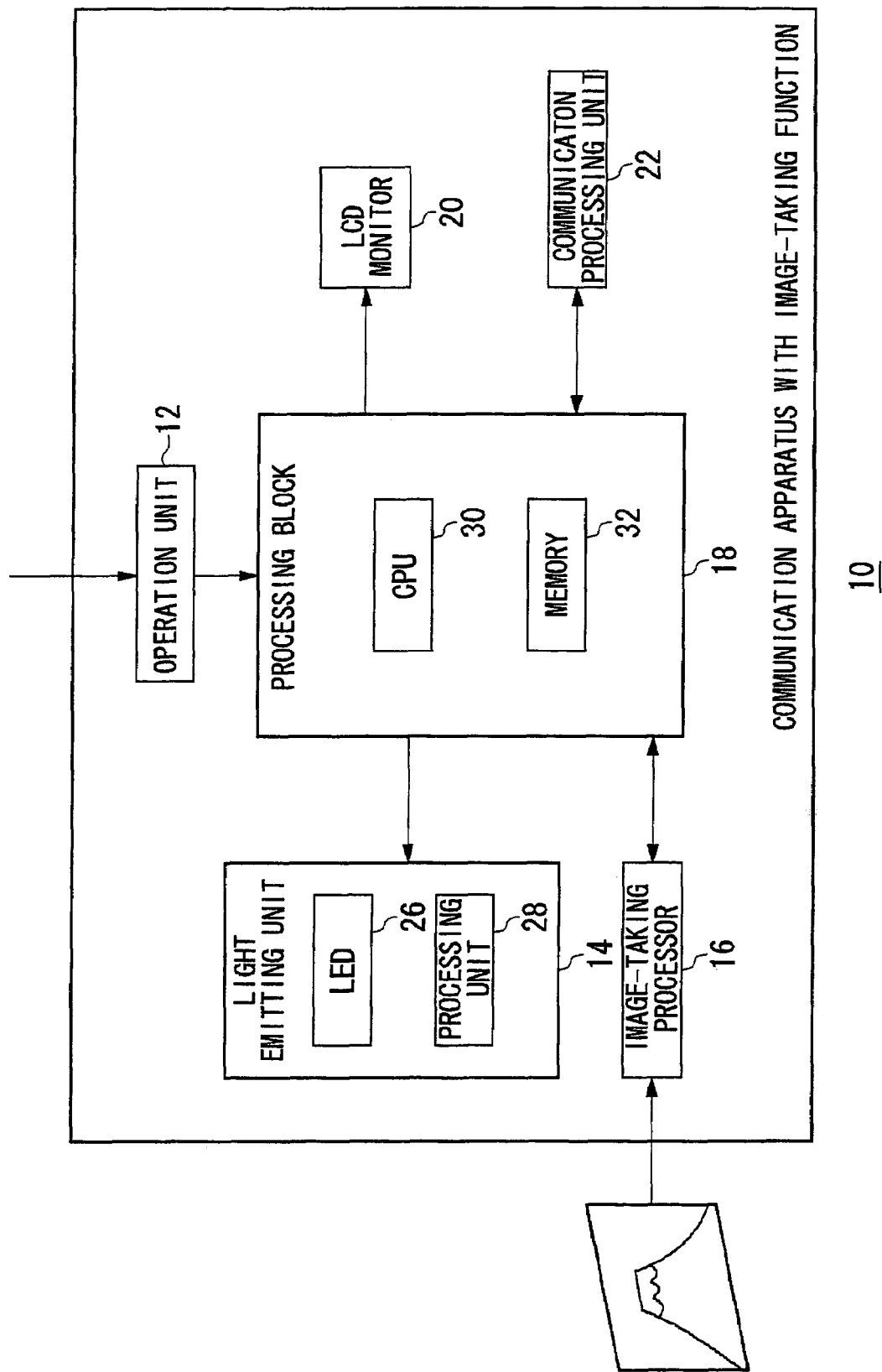
FIG. 1 illustrates a structure of a communication apparatus with an image-taking function according to a first embodiment of the present invention.

The invention will now be described based on the preferred embodiments, which do not intend to limit the scope of the present invention, but exemplify the invention. All of the features and the combinations thereof described in the embodiments are not necessarily essential to the invention.

An outline of the present invention will be first described before describing the present embodiments in detail. First and second embodiments according to the present invention relate to a drive control circuit for controlling the luminance of a plurality of LEDs provided in a communication apparatus such as a cellular phone and an emission control circuit that includes a plurality of LEDs and said drive control circuit. Hereinbelow, if no distinction is made between the first embodiment and the second embodiment, such a mode of carrying out the present invention will be generically called "the present embodiment" as appropriate. The emission control circuit according to the present embodiment, which has LEDs coupled with PWM circuits within a drive control circuit via transistors, has a function of changing the periods of time in which the respective transistors are on by changing the duty ratios of pulse signals generated by the PWM circuits. Here, changing a duty ratio is synonymous with changing a pulse width. A plurality of LEDs include green LEDs, blue LEDs and red LEDs, and the respective LEDs, for instance, flicker in a predetermined pattern in synchronization with a ringtone of a communication device.

When a single LED lights up alone, the drive control circuit according to the present embodiment carries out a processing to gradually increase with time the pulse width of a pulse signal generated by a PWM circuit (hereinafter referred to simply as "first emission control processing") and then a processing to gradually decrease it (hereinafter referred to simply as "second emission control processing") according to predetermined parameters. The drive control circuit according to the present embodiment carries out the first emission control processing and the second emission control processing (hereinafter referred to simply as "emission control processing") repeatedly.

The drive control circuit according to the present embodiment can change a cycle for increasing a pulse width step by step during a first emission control processing (hereinafter referred to simply as "increasing cycle"). In other words, an initial value, an intermediate value and a maximum value of a pulse width are determined beforehand, and, with the passage of time, an increasing cycle can be set individually within a period when the pulse width is increased gradually from the initial value to the intermediate value (hereinafter referred to simply as "first slope period") and within a period when the pulse width is increased gradually from the intermediate value to the maximum value (hereinafter referred to simply as "second slope period"). In a similar manner, the drive control circuit according to the present embodiment can change a cycle for decreasing a pulse width step by step during a second emission control processing (hereinafter referred to simply as "decreasing cycle"). In other words, a decreasing cycle can be set individually within a period when the pulse width is decreased gradually from the maximum value to the intermediate value (hereinafter referred to simply as "third slope period") and within a period when the pulse width is decreased gradually from the intermediate value to the initial value (hereinafter referred to simply as "fourth slope period").

There are not only cases where a single LED lights up alone but also cases where a plurality of LEDs light up at the same time to produce a light emission as a whole in a color different from those of the lit LEDs. The tone of an emitted color to be realized by a plurality of LEDs is determined according to the ratio of the light emission amounts of the respective lit LEDs. For example, a yellow will be emitted if a green LED and a red LED emit their lights at the same intensity and a blue LED remains unlit. In the lighting of a plurality of such LEDs, the drive control circuit according to the present embodiment controls the PWM circuits corresponding to the plurality of LEDs in such a way as to synchronize the cycles of emission control processing for the plurality of LEDs.

Furthermore, the emission control circuit according to the present embodiment controls the luminance of an emitted color in addition to the tone of the emitted color to be realized by a plurality of LEDs. For example, even with the lighting of a red LED alone, control can be made for a bright red emission or a dark red emission. According to the present embodiment, two options are available as a method for controlling the brightness of the LEDs, namely, one of adjusting the pulse width of PWM as described above and the other of adjusting the amount of drive current.

FIRST EMBODIMENT

FIG. 1 illustrates a structure of a communication apparatus with an image-taking function 10 according to a first embodiment of the present invention. The communication apparatus with an image-taking function 10 includes an operation unit 12, a light emitting unit 14, an image-taking processor 16, a processing block 18, an LCD monitor 20 and a communication processing unit 22. The light emitting unit 14 includes LEDs 26 and a processing unit 28, and the processing block 18 includes a CPU 30 and a memory 32. In the present embodiment, the above-described emission control circuit corresponds to a light emitting unit 14 shown in FIG. 1.

The communication processing unit 22 performs a processing necessary for communication. Here a PDC (Personal Digital Cellular) system is assumed as a mobile telephone system, but it may be such other system as a personal handyphone system (PHS) or a CDMA (Code Division Multiple Access) type mobile communication system.

The image-taking processor 16 performs an image pickup processing upon receiving instructions from the processing block 18. The image-taking processor 16 includes a lens, an aperture, an optical LPF (low-pass filter), a CCD, a signal processor and so forth, which are all not shown. The CCD accumulates an electric charge in proportion to the amount of light in an object image formed on the light-receiving surface thereof, and the electric charge is read out as a voltage signal. The voltage signal is decomposed into the R, G and B components by the signal processor, which are then subjected to a white balance adjustment and a gamma correction. The R, G and B signals are then A-D converted and thus turned into digital image data, which are outputted to the processing block 18.

As part of a communication function, the operation unit 12 includes buttons through which the user enters a telephone number or the like. As part of an image-taking function, the operation unit 12 includes a power switch, a release switch and the like with which the user picks up an image or sets various operation modes. As part of a communication function, the LCD monitor 20 displays a telephone number of the other party of communication or the like. As part of an image-taking function, the LCD monitor 20 displays not only an object image but also the pickup/playback mode, zoom value and the like.

The light emitting unit 14 flashes the LED 26 when a call arrives at the communication processing unit 22. The processing unit 28 carries out a processing for flashing the LED 26.

The processing block 18, which controls the whole process of the communication apparatus with an image-taking function 10, includes a CPU 30 and a memory 32. A structure may be such that an external memory is used as the memory 32. The CPU 30 generates a clock signal CLK.

Figure 2:
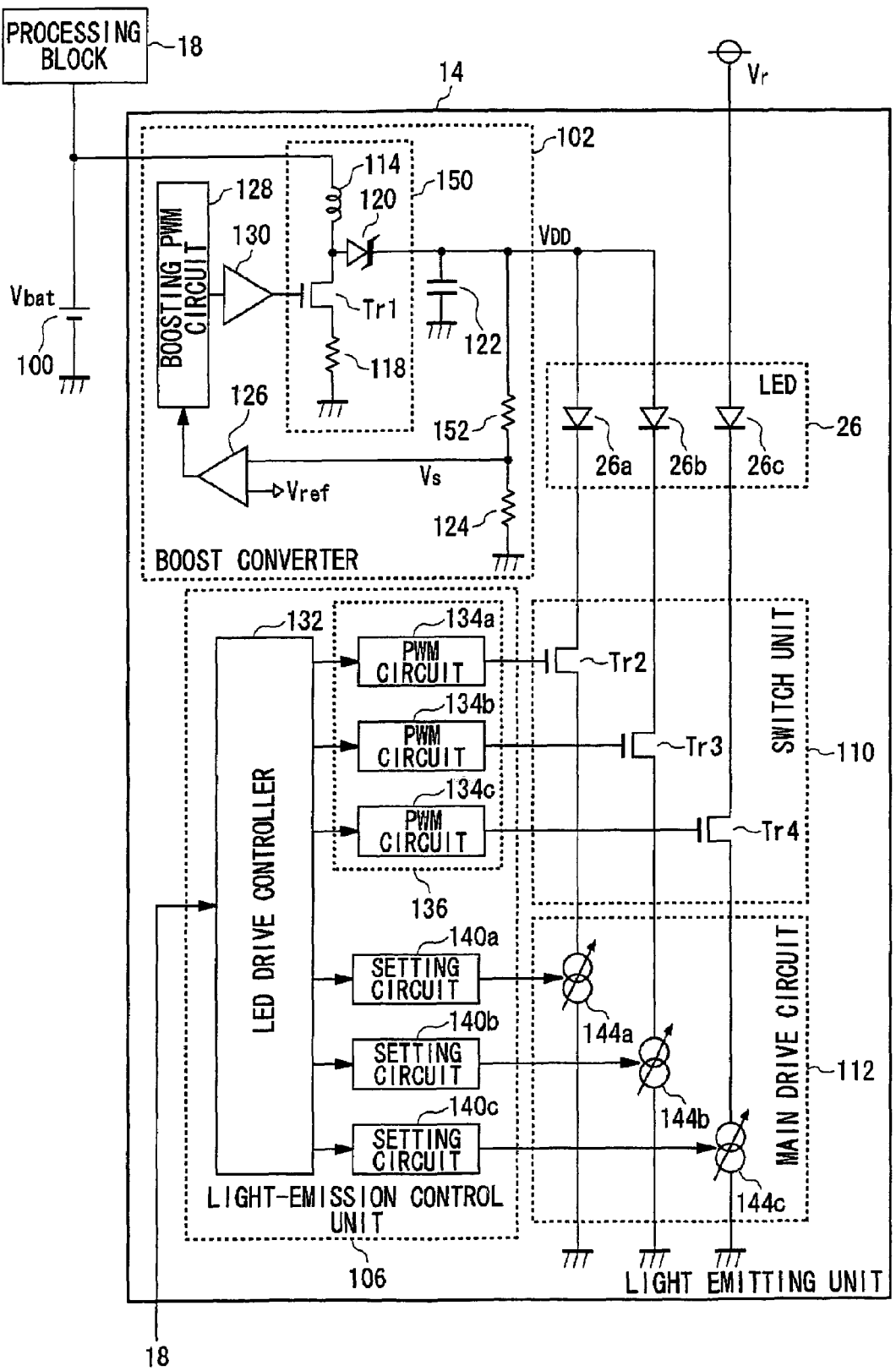
FIG. 2 illustrates a structure of a light emitting unit shown in FIG. 1.

FIG. 2 illustrates a structure of a light emitting unit 14. The light emitting unit 14 is connected to a lithium-ion battery 100 and a processing block 18 and includes a boost converter 102, a first LED 26a, a second LED 26b and a third LED 26c, which are generically called LEDs 26, a light-emission control unit 106, a switch unit 110 and a main drive circuit 112. The boost converter 102 includes a boost chopper circuit 150, a capacitor 122, a first resistor 152, a second resistor 124, an error amplifier 126, a boosting PWM circuit 128 and a driver 130. The boost chopper circuit 150 includes an inductance 114, a resistor 118, a Schottky barrier diode 120 and a transistor Tr1. The light-emission control unit 106 includes an LED drive controller 132, a first PWM circuit 134a, a second PWM circuit 134b and a third PWM circuit 134c, which are contained in the above-described drive control circuit 136, and a first setting circuit 140a, a second setting circuit 140b and a third setting circuit 140c, which are generically called setting circuits 140. The switch unit 110 includes a transistor Tr2, a transistor Tr3 and a transistor Tr4. And the main drive circuit 112 includes a first variable-current circuit 144a, a second variable-current circuit 144b and a third variable-current circuit 144c, which are generically called variable-current circuits 144. The parts of the light emitting unit 14 other than the LEDs 26 correspond to the processing 28 shown in FIG. 1. The first PWM circuit 134a and the second PWM circuit 134b and the third PWM circuit 134c may be generically called PWM circuits 134.

The boost converter 102 receives a battery voltage Vbat of the lithium-ion battery 100 as input voltage, boosts the input voltage by a switching strategy, and outputs a boosted voltage $V_{DD}$. It is assumed here that the battery voltage Vbat is 3 V. Through the ON/OFF operation of the transistor Tr1, the boost chopper circuit 150 accumulates energy in the inductance 114 and discharges energy from the inductance 114, thus boosting the battery voltage Vbat so as to be converted to a boosted voltage $V_{DD}$. In the boost chopper circuit 150, a drain current flows to the resistor 118 through the inductance 114 while the transistor Tr1 is on, and a magnetic energy is stored in the inductance 114 by the battery voltage Vbat. Then, when the transistor Tr1 turns off, the magnetic energy, which has been stored in the inductance 114 during the ON period of the transistor Tr1, is released as an electric energy, which becomes a current flowing through the Schottky barrier diode 120. The voltage generated at the inductance 114 is added in series to the battery voltage Vbat, stabilized by the capacitor 122, and outputted as a boosted voltage $V_{DD}$.

The boosting rate of the boosted voltage $V_{DD}$ to be outputted from the boost chopper circuit 150 is determined by the ON/OFF time ratio of the transistor Tr1, which functions as a switch. The boost PWM circuit 128, which is a circuit for creating the ON/OFF time ratio of this switch, generates a pulse signal of Ton/T duty ratio, where T is the ON/OFF switching cycle of the switch and Ton is the time during which the switch is on. The driver 130 turns the transistor Tr1 on and off according to the pulse signal generated by the boosting PWM circuit 128. That is, the transistor Tr1 turns on when the pulse signal is at H level and turns off when the pulse signal is at L level.

The pulse width of a pulse signal generated by the boosting PWM circuit 128 changes with the output of the error amplifier 126. The error amplifier 126 compares a detected voltage Vs, which is obtained by dividing a boosted voltage $V_{DD}$ by two voltage-dividing resistors, a first resistor 152 and a second resistor 124, with a reference voltage Vref from the reference voltage source, amplifies the error of the detected voltage Vs from the reference voltage Vref, and feeds back the output to the boosting PWM circuit 128. The boosting PWM circuit 128 modulates the pulse width of a pulse signal by controlling the switch ON time width Ton according to the output of the error amplifier 126 and brings the detected voltage Vs to agree with the reference voltage Vref by feedback control.

The first LED 26a emits green light; the second LED 26b emits blue light; and the third LED 26c emits red light. Here, the first LED 26a and the second LED 26b normally operate on a drive voltage of about 4.5 V, so that the aforementioned boosted voltage $V_{DD}$ is set at 4.5 V. On the other hand, the third LED 26c normally operates on a drive voltage of about 2.5 V, so that Vr is set at 2.5 V.

The transistors Tr2 to Tr4, which are provided between the LEDs 26 and the main drive circuit 112 to be described below, effect cutoff or conduction between the LEDs 26 and the main drive circuit 112. That is, when the voltage applied to the gate of the transistor Tr2 goes high (H level) and the transistor Tr2 turns on, current flows between the first LED 26a and the first variable current circuit 144a to be described below. The transistor Tr3 and the transistor Tr4 operate the same way, and the LEDs 26 light up during the ON time of the transistors Tr2 to Tr4, respectively. It is to be noted here that the transistors Tr2 to Tr4 are turned on independently of each other by the light-emission control unit 106 to be described below.

The variable current circuits 144 send current to drive their respective LEDs 26. The strength of current to be sent from the variable current circuits 144 is a maximum of, for example, about 25 mA as mentioned above and takes values in a plurality of levels, which are controlled by the light emission controller 106 to be described below. The luminance of the LEDs 26 changes with the strength of current sent in a plurality of levels.

The LED drive controller 132 supplies a clock signal CLK sent from the processing block 18 and parameters necessary for controlling the light emission by the LEDs 26 to the PWM circuits 134, thereby allowing PWM modulation according to the parameters and also controlling the strength of drive current to be sent from the variable current circuits 144. According to the present embodiment, the LED drive controller 132 controls the operation of the PWM circuit 134a in such a way as to gradually increase the light emission amount of the first LED 26a and then gradually decrease it. In other words, the operation of the first PWM circuit 134a is so controlled with the passage of time that a pulse signal, whose H level period gets longer gradually and then gets shorter gradually, is outputted to the transistor Tr2. A similar control is performed on the second PWM circuit 134b and the third PWM circuit 134c as well. To raise the luminance of the LEDs 26, the operation of the setting circuits 140 is controlled such that the drive current to be sent from the variable current circuits 144 is made larger.

The PWM circuits 134 send out pulse signals of various pulse widths by gradually increasing and decreasing the pulse width in predetermined cycles during predetermined periods based on the parameters supplied from the LED drive controller 132 that determine a first emission control processing period, a second emission control processing period, first to fourth slope periods and the like.

Next, within the respective PWM circuits 134 shown in FIG. 2, the focus is placed on a circuit that realizes a function of generating a pulse signal of a predetermined pulse width (hereinafter referred to simply as "PWM basic control circuit"), and the structure and operation thereof will be explained using FIG. 3.

Figure 3:
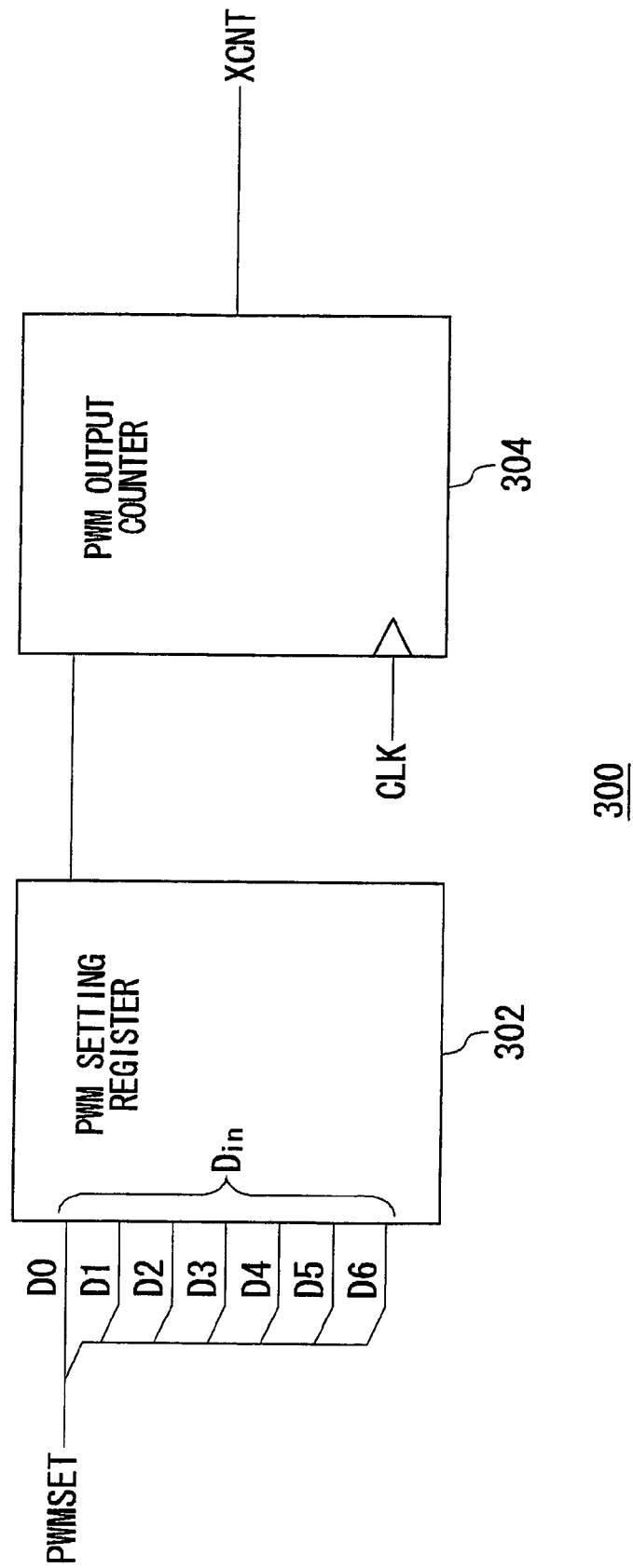
FIG. 3 shows a detailed internal structure of a PWM basic control circuit.

FIG. 3 shows a detailed internal structure of a PWM basic control circuit 300. The PWM basic control circuit 300, which includes a 7-bit PWM setting register 302 and a 7-bit PWM output counter 304, counts a clock signal CLK inputted thereto and outputs a pulse signal of a predetermined pulse width which is set according to the signal. This pulse signal is generated based on clock signal CLK. More specifically, given a value of a predetermined pulse width, the PWM basic control circuit 300 generates a pulse signal which remains at H level until counting of the clock signal CLK is completed for the value of the pulse width.

To $D_{in}$ of the PWM setting register 302, the values of 7 bits, namely, a first input signal D0 to a seventh input signal D6, which constitute a digital value as a PWMSET value, are inputted and temporarily stored by the PWM setting register 302. PWMSET is a parameter that indicates a pulse width value of a pulse signal. The PWM setting register 302 sends out a PWMSET value having been stored therein to the PWM output counter 304. It is to be noted that the PWM setting register 302 and the PWM output counter 304 may not only be of 7-bit setup but also of any-bit setup. In the present embodiment, "1" is set, as an initial value of PWMSET value, in the PWM setting register 302.

The PWM output counter 304 counts the clock signal in accordance with the timing at which the clock signal CLK is inputted, and outputs an XCNT signal, which is active from 0 to the PWMSET value and inactive from PWMSET value to 127.

Figure 4:
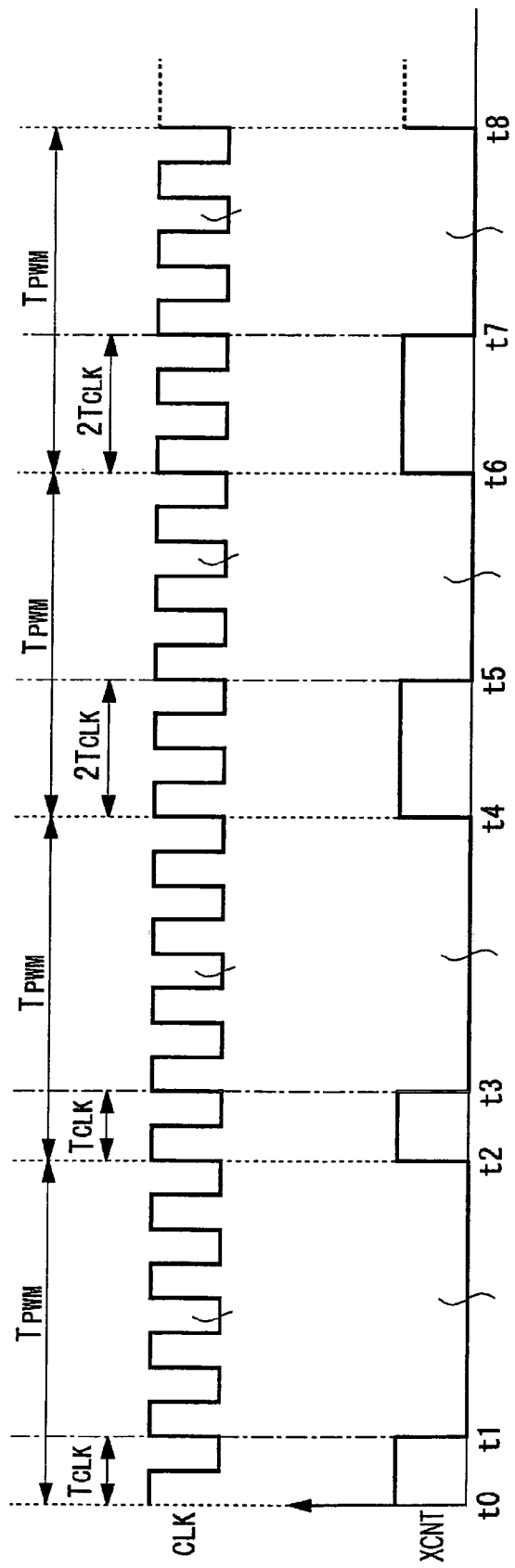
FIG. 4 illustrates a timing chart of a clock signal and a corresponding graph showing an example of change with time of an XCNT signal outputted by a PWM basic control circuit.

FIG. 4 illustrates a timing chart of a clock signal CLK and a corresponding graph showing an example of change with time of the XCNT signal outputted by a PWM basic control circuit 300. In this graph shown in FIG. 4, the vertical axis indicates the value of current flowing to an LED 26, and the horizontal axis indicates time. For a certain period of time, the pulse width remains the same, but shown as a whole are the XCNT signal whose pulse width is increasing gradually with time. For example, if $T_{CLK}$ denotes a cycle of the clock signal CLK and $T_{PWM}$ a cycle of the pulse signal of PWM, then $T_{CLK}$ corresponds to the period between time t0 and time t1, and $T_{PWM}$ the period between time t0 and time t2. According to the present embodiment, 1 $T_{PWM}$ corresponds to 128 $T_{CLK}$'S. However, the number of $T_{CLK}$'S contained in 1 $T_{PWM}$ may be changed to 64 or 32 by changing the number of bits for the PWM setting register 302 and the PWM output counter 304.

As shown in FIG. 4, at time t0, when 1 as the PWMSET value is inputted to the PWM setting register 302, an XCNT signal with a pulse width of 1, which is at H level for the same period as one cycle $T_{CLK}$ of the clock signal CLK, is outputted. Then, at time t4, when the PWMSET value is changed to 2, an XCNT signal with a pulse width of 2 is outputted.

Figure 5:
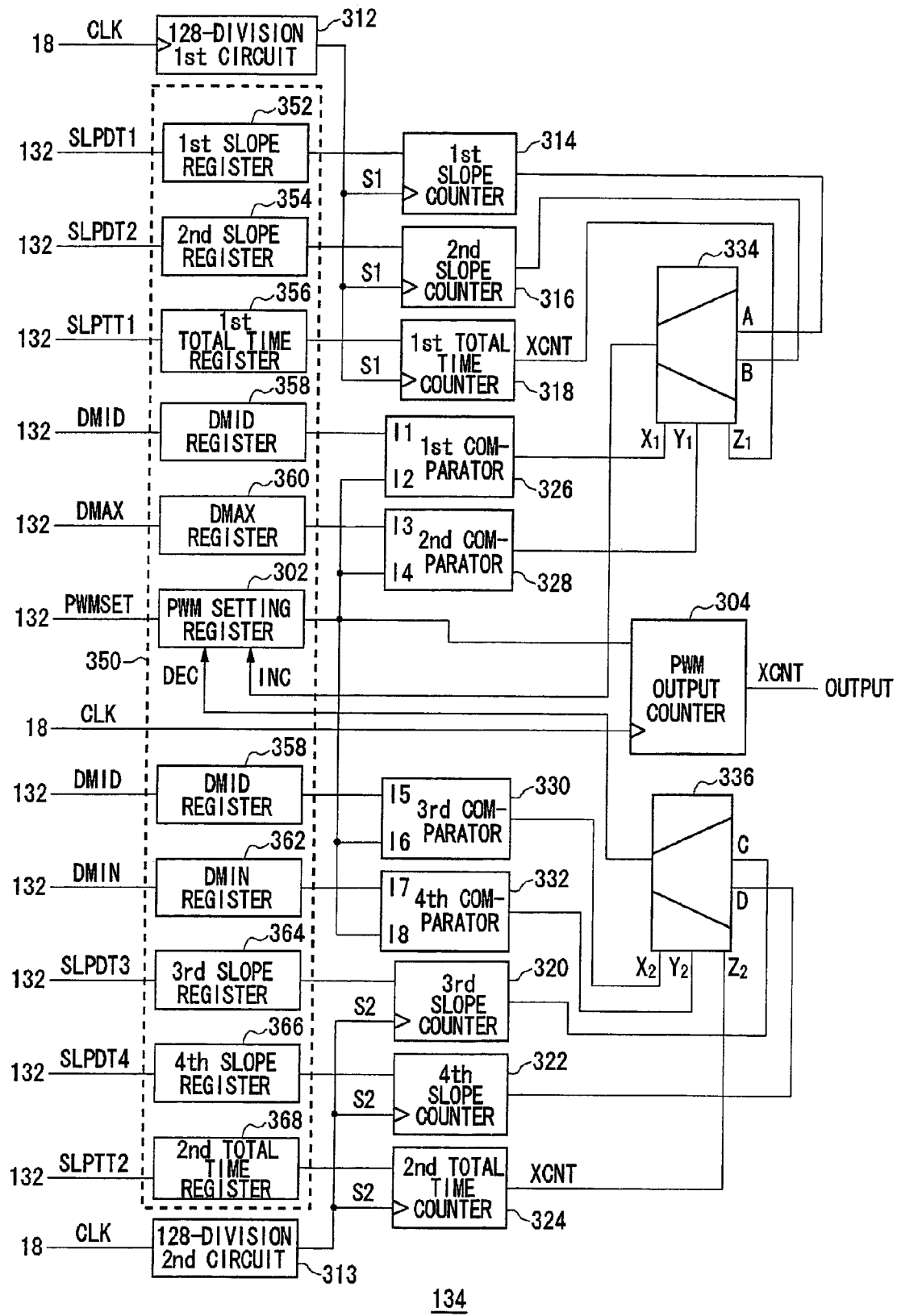
FIG. 5 illustrates a detailed internal structure of a PWM circuit.

FIG. 5 shows a detailed internal structure of each of the PWM circuits 134. The names of principal signals appearing in FIG. 5 are as follows:

INC: Increment signal.

DEC: Decrement signal.

It is to be noted here that the following description may sometimes use the alphabetic abbreviations for the signal names.

Now the parameters for light emission control to be set in a variety of registers as shown in FIG. 5 will be outlined hereinbelow:

SLPTT1: Period during which pulse width is increased, herein called a first emission control processing period.

SLPTT2: Period during which pulse width is decreased, herein called a second emission control processing period.

DMIN: Initial pulse width setting value.

DMID: Intermediate pulse width setting value.

DMAX: Maximum pulse width setting value.

SLPDT1: Period in which a pulse width of DMIN and over to DMID (exclusive) appears during SLPTT1, herein called the duration of the same pulse width during a first slope period.

SLPDT2: Period in which a pulse width of DMID and over to DMAX (exclusive) appears during SLPTT1, herein called the duration of the same pulse width during a second slope period.

PLPDT3: Period in which a pulse width of DMID and over to DMAX (inclusive) appears during SLPTT2, herein called the duration of the same pulse width during a third slope period.

SLPDT4: Period in which a pulse width of DMIN and over to DMID (exclusive) appears during SLPTT2, herein called the duration of the same pulse width during a fourth slope period.

The parameters for light emission control have been outlined above, and the following description may sometimes use these alphabetic abbreviations for the parameters for light emission control.

As mentioned earlier, the PWM circuits 134 delivers the XCNT signal of various pulse widths by gradually increasing and decreasing the pulse width in predetermined cycles during predetermined periods respectively based on the above-mentioned various types of parameters. A PWM circuits 134 includes a parameter setting circuit 350 for light emission control, a 128-division first circuit 312, a first slope counter 314, a second slope counter 316, a third slope counter 320, a fourth slope counter 322, a first comparator 326, a second comparator 328, a third comparator 330, a fourth comparator 332, a first total time counter 318, a second total time counter 324, a 128-division second circuit 313, a first selector 334, a second selector 336 and a PWM output counter 304.

The parameter setting circuit 350 for light emission control, which has registers to store various types of parameters sent out from the LED drive controller 132 for controlling the light emission of the LEDs 26, is comprised of a first slope register 352, a second slope register 354, a third slope register 364, a fourth slope register 366, a first total time register 356, a second total time register 368, a DMAX register 360, two DMID registers 358, a DMIN register 362 and a PWM setting register 302. As will be discussed in detail later, it is understood by those skilled in the art that the operation characteristics of the PWM setting register 302 and the PWM output counter 304 shown in FIG. 5 are within the same range as those of the PWM setting register 302 and the PWM output counter 304 shown in FIG. 3.

The 128-division first circuit 312 and the 128-division second circuit 313 each send out an H-level output upon counting 128 of the clock signal CLK. Control is performed by the LED drive controller 132 in such a manner that a clock signal CLK is inputted to the 128-division first circuit 312 during a first emission control processing period and to the 128-division second circuit 313 during a second emission control processing period.

The first slope register 352, the second slope register 354, the third slope register 364 and the fourth slope register 366 store the values of SLPDT1, SLPDT2, SLPDT3 and SLPDT4, respectively. The first total time register 356 and the second total time register 368 store the values of SLPTT1 and SLPTT2, respectively. And the DMAX register 360, the DMID registers 358 and the DMIN register 362 store the values of DMAX, DMID and DMIN, respectively.

The first slope counter 314, the second slope counter 316, the third slope counter 320 and the fourth slope counter 322 receive the values of SLPDT1, SLPDT2, SLPDT3 and SLPDT4, respectively, outputted from the first slope register 352, the second slope register 354, the third slope register 364 and the fourth slope register 366, respectively. The first slope counter 314 and the second slope counter 316 send out an H-level output as A signal in the SLPDT1 value cycle and an H-level output as B signal in the SLPDT2 value cycle, respectively. This makes it possible to control the increasing cycle of pulse width within the first slope period and the second slope period, respectively. Similarly, the third slope counter 320 and the fourth slope counter 322 send out an H-level output as C signal in the SLPDT3 value cycle and an H-level output as D signal in the SLPDT4 value cycle, respectively. This makes it possible to control the decreasing cycle of pulse width within the third slope period and the fourth slope period, respectively.

The first total time counter 318 and the second total time counter 324 receive the values of SLPTT1 and SLPTT2, respectively, outputted from the first total time register 356 and the second total time register 368, respectively. The first total time counter 318 counts a signal S1 from the 128-division first circuit 312 and the second total time counter 324 counts a signal S2 from the 128-division second circuit 313, and they each output an XCNT signal, which is active until the counted signal reaches the outputted value of SLPTT1 or SLPTT2 and inactive when the counted signal reaches the outputted value of SLPTT1 or SLPTT2 and thereafter. This enables control of the first emission control processing period and the second mission control processing period, respectively.

The first comparator 326 compares an input signal I1 and an input signal I2 and sends out to the first selector 334 an L-level output as $X_1$ signal when the input signal I2 is smaller than the signal I1 and an H-level output as $X_1$ signal when the input signal I2 is larger than or equal to the signal I1. Here the input signal I1 and the input signal I2 indicate a DMID value and a PWMSET value, respectively. With this structure and function, the first slope period can be controlled.

The second comparator 328 compares an input signal I3 and an input signal I4 and sends out to the first selector 334 an L-level output as $Y_1$ signal when the input signal I4 is smaller than the signal I3 and an H-level output as $Y_1$ signal when the input signal I4 is larger than or equal to the signal I3. Here the input signal I3 and the input signal I4 indicate a DMAX value and a PWMSET value, respectively. With this structure and function, the second slope period can be controlled.

The third comparator 330 compares an input signal I5 and an input signal I6 and sends out to the second selector 336 an L-level output as $X_2$ signal when the input signal I5 is smaller than the signal I6 and an H-level output as $X_2$ signal when the input signal I5 is larger than or equal to the signal I6. Here the input signal I5 and the input signal I6 indicate a DMID value and a PWMSET value, respectively. With this structure and function, the third period can be controlled.

The fourth comparator 332 compares an input signal I7 and an input signal I8 and sends out to the second selector 336 an L-level output as $Y_2$ signal when the input signal I7 is smaller than the signal I8 and an H-level output as $Y_2$ signal when the input signal I7 is larger than or equal to the signal I8. Here the input signal I7 and the input signal I8 indicate a DMIN value and a PWMSET value, respectively. With this structure and function, the fourth slope period can be controlled.

The first selector 334 selects either of signal A and signal B, based on $X_1$ signal, $Y_1$ signal and $Z_1$ signal and sends out the selected signal as INC to the PWM setting register 302. This is a so-called 3-bit selection type selector. This arrangement enables increment, by 1, of the PWMSET value stored in the PWM setting register 302 when INC rises to H level, and as a result, the pulse width of an XCNT signal to be outputted increases by 1. Thereby, an XCNT signal whose pulse width increases gradually can be outputted. In this case, since the pulse width increases in units of 1 by the increment signal, the unit of the minimum modulation for pulse width that indicates the minimum variation when the pulse width of XCNT signal varies is "1" in the present embodiment. As another example, if an arrangement is such that it is so designed as to increment by 2, then the unit of the minimum modulation for pulse width will be "2".

The second selector 336 selects either of signal C and signal D, based on $X_2$ signal, $Y_2$ signal and $Z_2$ signal and sends out the selected signal as DEC to the PWM setting register 302. This is a so-called 3-bit selection type selector. This arrangement enables decrement, by 1, of the PWMSET value stored in the PWM setting register 302 when DEC rises to H level, and as a result, the pulse width of an XCNT signal to be outputted decreases by 1. Thereby, an XCNT signal whose pulse width decreases gradually can be outputted.

FIG. 6A is a truth table of inputs and outputs of signals at the first selector 334, and FIG. 6B is a truth table of inputs and outputs of signals at the second selector 336. FIG. 6A shows the status of each output signal when $X_1$ signal, $Y_1$ signal and $Z_1$ signal are inputted to the first selector 334. As shown in FIG. 6A, provided that the $Z_1$ signal is high (H level), the first selector 334 selects and outputs signal A when the $X_1$ signal is low (L level) and the $Y_1$ signal is also low (L level), selects and outputs signal B when the $X_1$ signal is high (H level) and the $Y_1$ signal is low (L level), and outputs an L level in other cases.

FIG. 6B shows the status of each output signal when $X_2$ signal, $Y_2$ signal and $Z_2$ signal are inputted to the second selector 336. As shown in FIG. 6B, provided that the $Z_2$ signal is high (H level), the second selector 336 selects and outputs signal C when the $X_2$ signal is low (L level) and the $Y_2$ signal is also low (L level), selects and outputs signal D when the $X_2$ signal is high (H level) and the $Y_2$ signal is low (L level), and outputs an L level in other cases.

Figure 7:
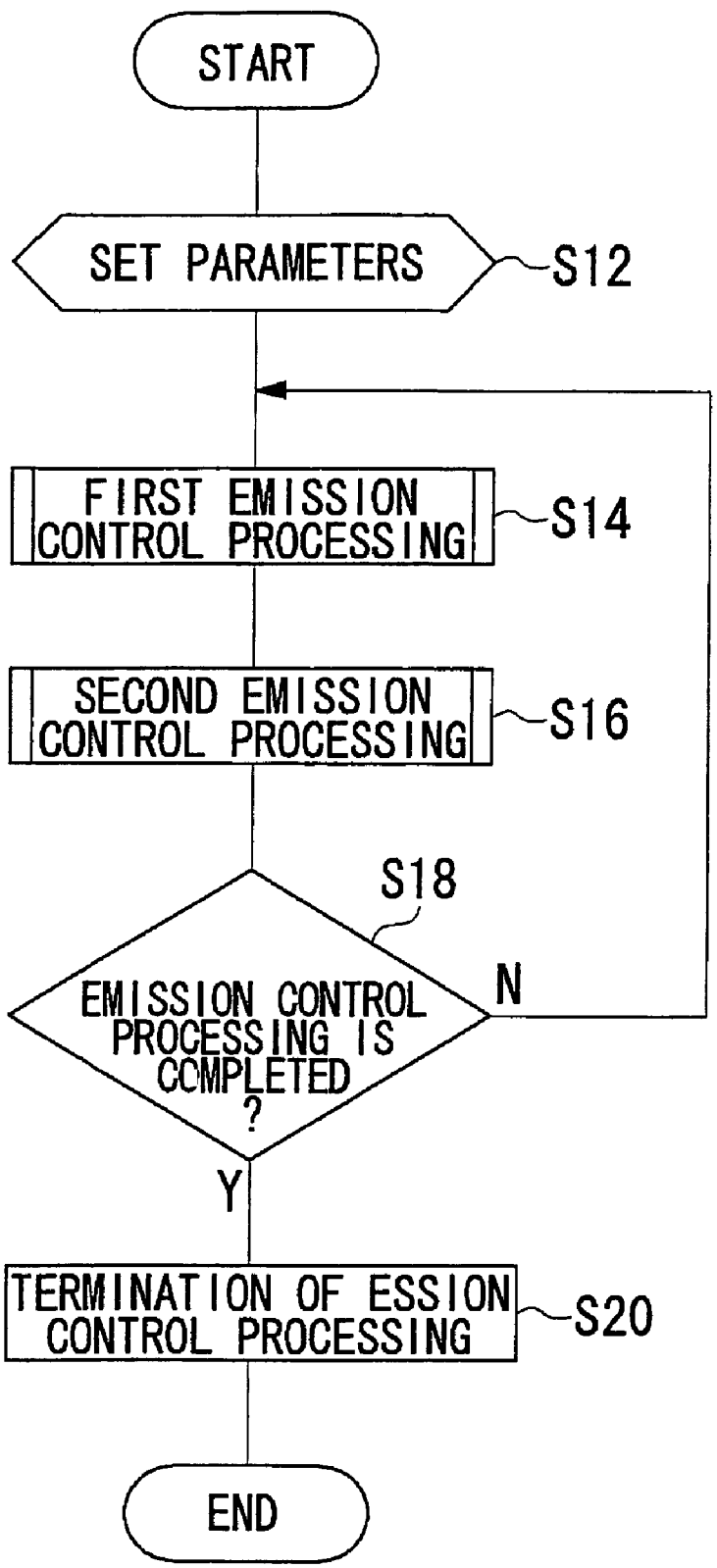
FIG. 7 is a flowchart showing a light emission control processing at a PWM circuit.
Figure 8:
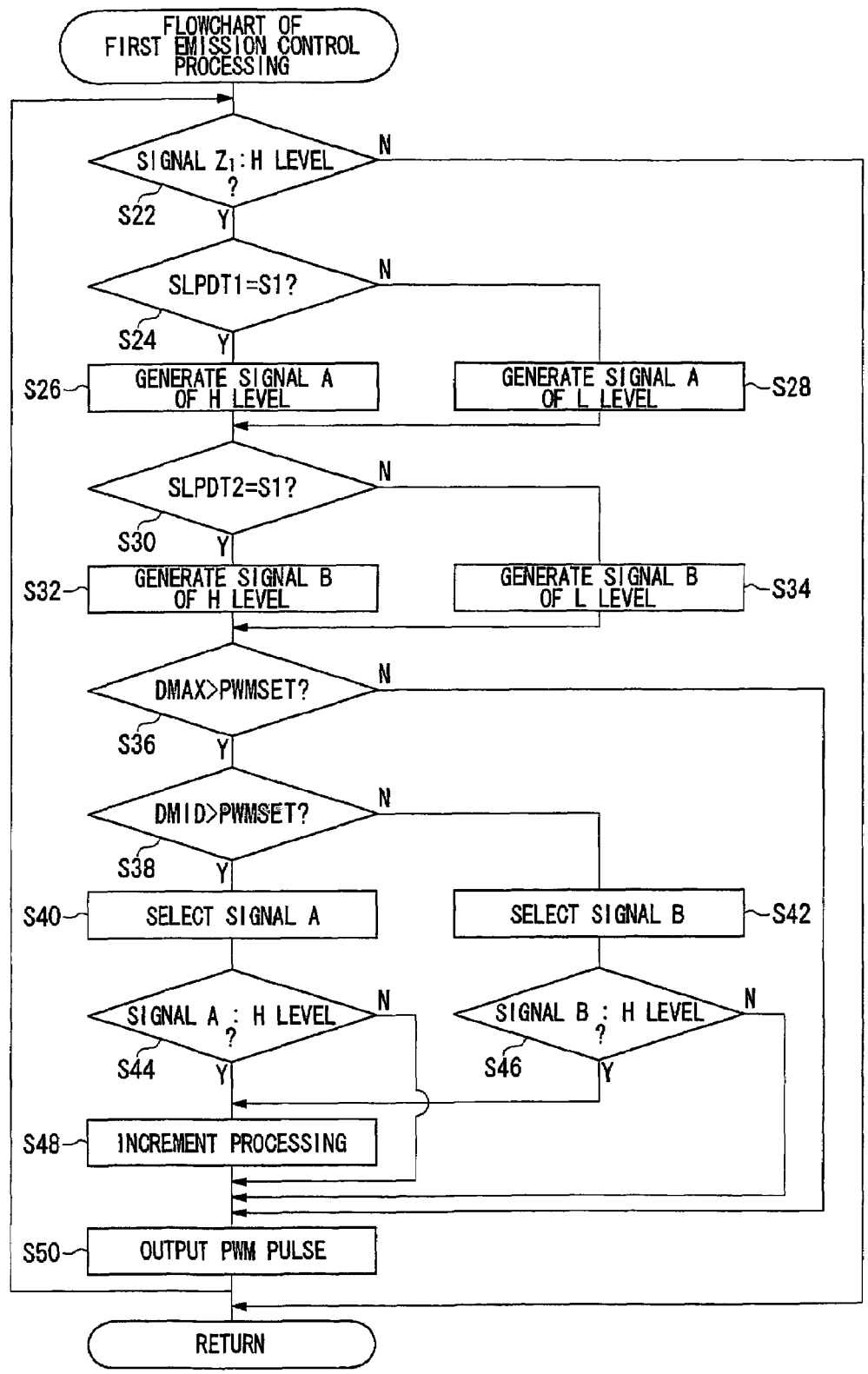
FIG. 8 is a flowchart showing a first emission control processing at a PWM circuit.
Figure 9:
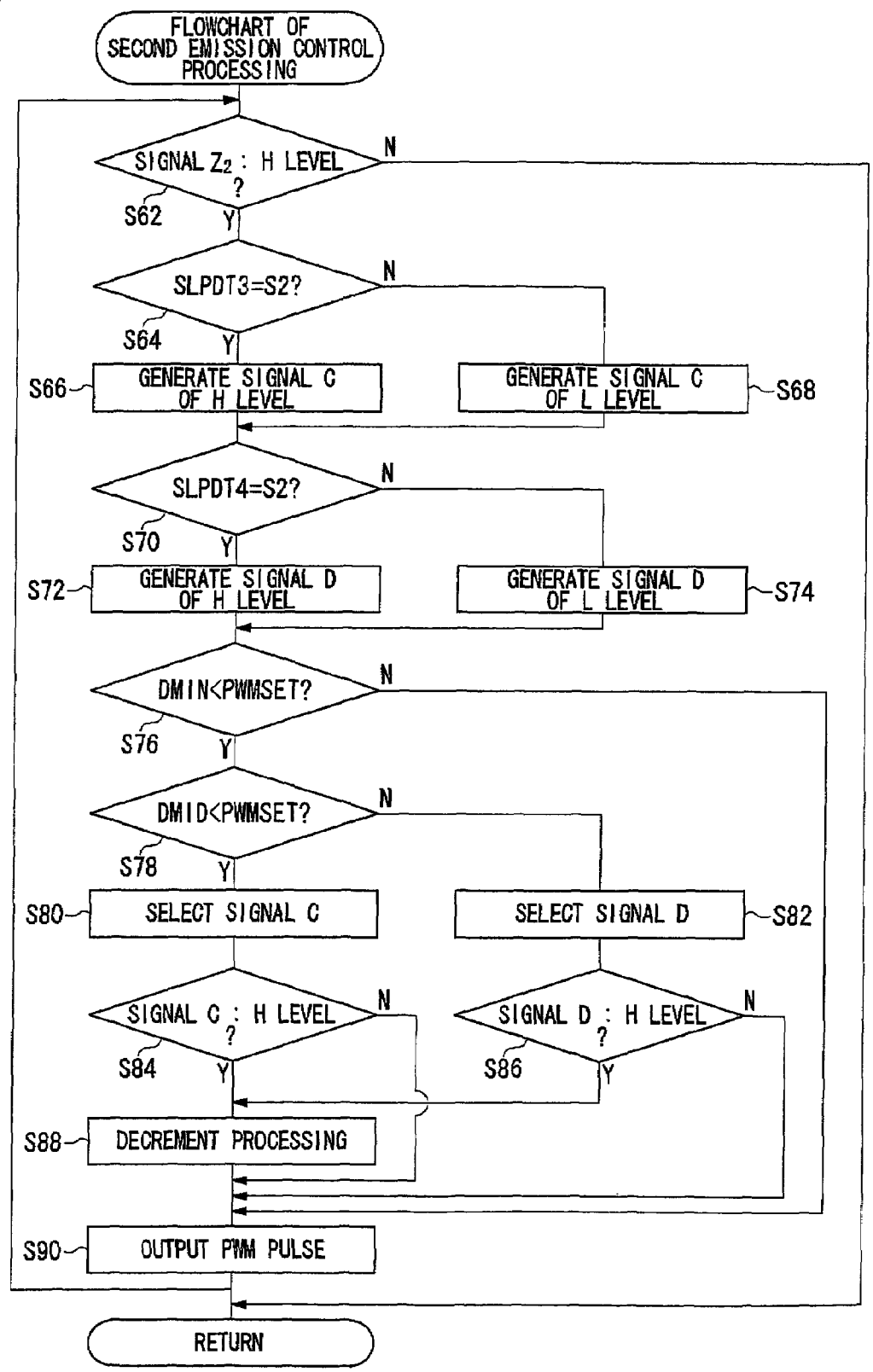
FIG. 9 is a flowchart showing a second emission control processing at a PWM circuit.

A function and operation achieved by employing the above-described structure will be described with reference to FIG. 7, FIG. 8 and FIG. 9. FIG. 7 is a flowchart showing a light emission control processing at a PWM circuit 134. FIG. 8 and FIG. 9 are flowcharts showing the details of some of the steps shown in FIG. 7.

Referring to FIG. 7, the LED drive controller 132 sets parameters for controlling light emission by an LED 26 in various types of registers within the parameter setting circuit 350 for light emission control in the PWM circuit 134 (S12). Then the processing block 18 performs a first emission control processing by inputting a clock signal CLK to the 128-division first circuit 312 and the PWM output counter 304 (S14).

FIG. 8 is a flowchart showing a first emission control processing at a PWM circuit 134. The PWM circuit 134 starts a first emission control processing when the $Z_1$ signal outputted from the first total time counter 318 is high (H level) (Y of S22).

The first slope counter 314 compares an S1 value and an SLPDT1 value and generates a signal A of L level (S28) when the S1 value is not equal to the SLPDT1 value (N of S24) or generates a signal A of H level (S26) when the S1 value is equal to the SLPDT1 value (Y of S24) before sending the signal to the first selector 334. In this manner, the increasing cycle of pulse width in the first slope period can be controlled.

In the same way as with the first slope counter 314, the second slope counter 316 compares an S1 value and an SLPDT2 value and generates a signal B of L level (S34) when the S1 value is not equal to the SLPDT2 value (N of S30) or generates a signal B of H level (S32) when the S1 value is equal to the SLPDT2 value (Y of S30) before sending the signal to the first selector 334. In this manner, a circuit for controlling the duration of an XCNT signal of the same pulse width can be provided.

Next, when the PWMSET value does not reach the DMAX value (Y of S36), that is, when the $Y_1$ signal is low (L level), the first selector 334 further carries out a comparison of the PWMSET value and the DMID value and selects a signal A as an INC output (S40) when the PWMSET value does not reach the DMID value (Y of S38), that is, when it is within the first slope period.

When the signal A is high (H level) (Y of S44), the PWM output counter 304 performs an increment processing on the PWMSET value stored in the PWM setting register 302 (S48) and outputs an XCNT signal of pulse width equal to the PWMSET value (S50). When the signal A is low (L level) (N of S44), the PWM output counter 304 skips the above-mentioned increment processing and outputs an XCNT signal (S50). Through the above flow of processing, one cycle $T_{PWM}$ of the XCNT signal is outputted.

When, during the repetition of XCNT signal output, the PWMSET value is incremented and thus reaches the DMID value, that is, when the $X_1$ signal goes high (H level) (N of S38), which means a transition from the first slope period to the second slope period, the first selector 334 selects a signal B as an INC output (S42).

When the signal B is high (H level) (Y of S46), the PWM output counter 304 performs an increment processing on the PWMSET value stored in the PWM setting register 302 (S48) and outputs an XCNT signal of pulse width equal to the PWMSET value (S50). When the signal B is low (L level) (N of S46), the PWM output counter 304 skips the above-mentioned increment processing and outputs an XCNT signal (S50).

When the PWMSET value is further incremented and reaches the DMAX value (N of S36), that is, when the $Y_1$ signal goes high (H level), an L level is outputted as an INC output, irrespective of the values of the signal A and signal B. That is, an increment processing is skipped and an XCNT signal is outputted (S50). When, during the repetition of XCNT signal output, the $Z_1$ signal goes low (L level) (N of S22), the first emission control processing is brought to an end and the second emission control processing is started.

FIG. 9 is a flowchart showing a second emission control processing at a PWM circuit 134. At the start of the second emission control processing, the LED drive controller 132 switches the clock signal CLK, which has been inputted to the 128-division first circuit 312, to the input to the 128-division second circuit 313. Then, the second emission control processing is started when the $Z_2$ signal outputted from the second total time counter 324 is high (H level) (Y of S62).

The third slope counter 320 compares an S2 value and an SLPDT3 value and generates a signal C of L level (S68) when the S2 value is not equal to the SLPDT3 value (N of S64) or generates a signal C of H level (S66) when the S2 value is equal to the SLPDT3 value (Y of S64) before sending the signal to the second selector 336. In this manner, the decreasing cycle of pulse width in the third slope period can be controlled.

In the same way as with the third slope counter 320, the fourth slope counter 322 compares an S2 value and an SLPDT4 value and generates a signal D of L level (S74) when the S2 value is not equal to the SLPDT4 value (N of S70) or generates a signal D of H level (S72) when the S2 value is equal to the SLPDT4 value (Y of S70) before sending the signal to the second selector 336. In this manner, the decreasing cycle of pulse width in the fourth slope period can be controlled.

Next, when the PWMSET value exceeds the DMIN value (Y of S76), that is, when the $Y_2$ signal is low (L level), the second selector 336 further carries out a comparison of the PWMSET value and the DMID value and selects a signal C as a DEC output (S80) when the PWMSET value exceeds the DMID value (Y of S78), that is, when it is within the third slope period.

When the signal C is high (H level) (Y of S84), the PWM output counter 304 performs a decrement processing on the PWMSET value stored in the PWM setting register 302 (S88) and outputs a pulse signal of pulse width equal to the PWM-SET value (S90). When the signal C is low (L level) (N of S84), the PWM output counter 304 skips the above-mentioned decrement processing and outputs an XCNT signal (S90). Through the above flow of processing, one cycle $T_{PWM}$ of the XCNT signal can be outputted.

When, during the repetition of XCNT signal output, the PWMSET value is decremented and thus reaches the DMID value, that is, when the $X_2$ signal goes high (H level) (N of S78), which means a transition from the third slope period to the fourth slope period, the second selector 336 selects a signal D as a DEC output (S82).

When the signal D is high (H level) (Y of S86), the PWM output counter 304 performs a decrement processing on the PWMSET value stored in the PWM setting register 302 (S88) and outputs an XCNT signal of pulse width equal to the PWMSET value (S90). When the signal D is low (L level) (N of S86), the PWM output counter 304 skips the above-mentioned decrement processing and outputs an XCNT signal (s90).

When the PWMSET value is further decremented and reaches the DMIX value (N of S86), that is, when the $Y_2$ signal goes high (H level), an L level is outputted as a DEC output, irrespective of the values of the signal A and signal B. A decrement processing is skipped and an XCNT signal is outputted (S90). When, during the repetition of pulse signal output, the $Z_2$ signal goes low (L level) (N of S62), the first emission control processing is brought to an end.

Referring back to FIG. 7, after the second emission control processing is completed, the LED drive controller 132 determines whether not to terminate the emission control processing. If it is determined that the emission control processing not be terminated (N of S18), the emission control is again repeated. If it is determined, on the other hand, that the emission control processing be terminated (Y of S18), the emission control processing is terminated (S20).

Figure 10:
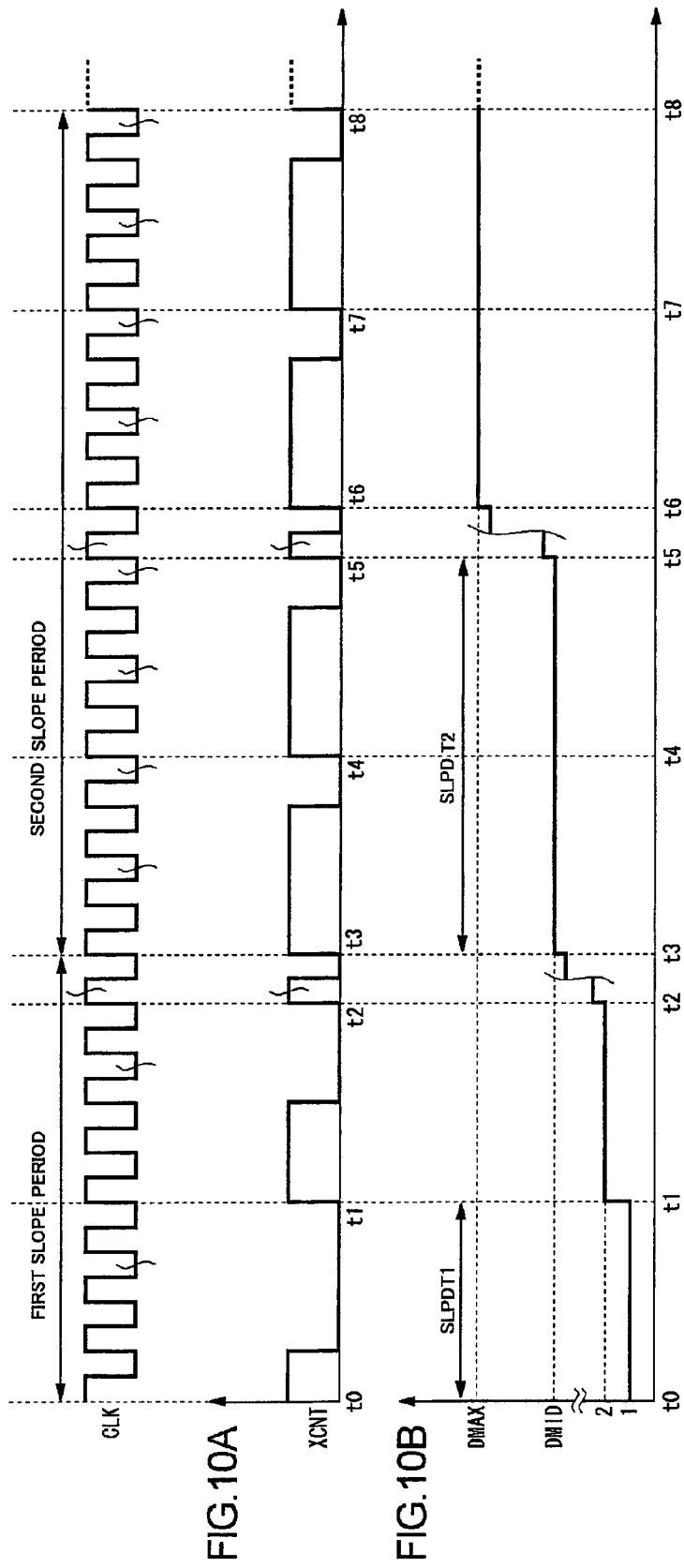
FIG. 10A illustrates a timing chart of a clock signal and a corresponding graph showing an example of change with time of an XCNT signal outputted in the first emission control processing.
FIG. 10B is a graph illustrating the change with time of pulse width of an XCNT signal outputted in the first emission control processing, which corresponds to the timing chart of FIG. 10A.

FIG. 10A illustrates a timing chart of a clock signal CLK and a corresponding graph showing an example of change with time of the XCNT signal outputted in the first emission control processing. The SLPD1 value, SLPDT2 value and PWMSET value in this case are set to "1", "2" and "1", respectively. FIG. 10B is a graph illustrating the change with time of pulse width of the XCNT signal outputted in the first emission control processing, which corresponds to the above timing chart of FIG. 10A.

In this graph shown in FIG. 10A, the vertical axis indicates the value of current flowing to an LED 26, and the horizontal axis indicates time. As shown in FIG. 10A, an XCNT signal with a pulse width of 1 appears in the period between time t0 and time t1; an XCNT signal with a pulse width of 2 appears in the period between time t1 and time t2; an XCNT signal with a pulse width of a DMID value appear both in the period between time t3 and time t4 and the period between time t4 and time t5; and an XCNT signal with a pulse width of a DMAX value appears between time t6 and time t7. Time t8 indicates the termination time of the first emission control processing, and the period between time to and t8 indicates the first emission control processing.

Referring to FIG. 10A, the period, between time t0 and time t3, during which the pulse width reaches the DMID value is the first slope period. Since the SLPDT1 value is "1" here, an XCNT signal with a pulse width that increases by 1 per one cycle of $T_{PWM}$ is outputted. The period between time t3 and time t8 during which the pulse width reaches the DMAX value is the second slope period. Since the SLPDT2 value is "2" here, an XCNT signal with a pulse width that increases by 1 per two cycles of $T_{PWM}$ is outputted. When the pulse width reaches the DMAX value, that is, during the period between time t6 and time t8, an XCNT signal with a pulse width of a MAX value is outputted.

In the graph shown in FIG. 10B, the vertical axis indicates PWMSET values, and the horizontal axis indicates time. Here, for example, SLPDT1 corresponds to the period between time t0 and time t1 and SLPDT2 corresponds to the period between time t3 and time t5, and the both periods are each set to multiples of $T_{PWM}$ where $T_{PWM}$ is the cycle of pulse-width modulation.

Figure 11:
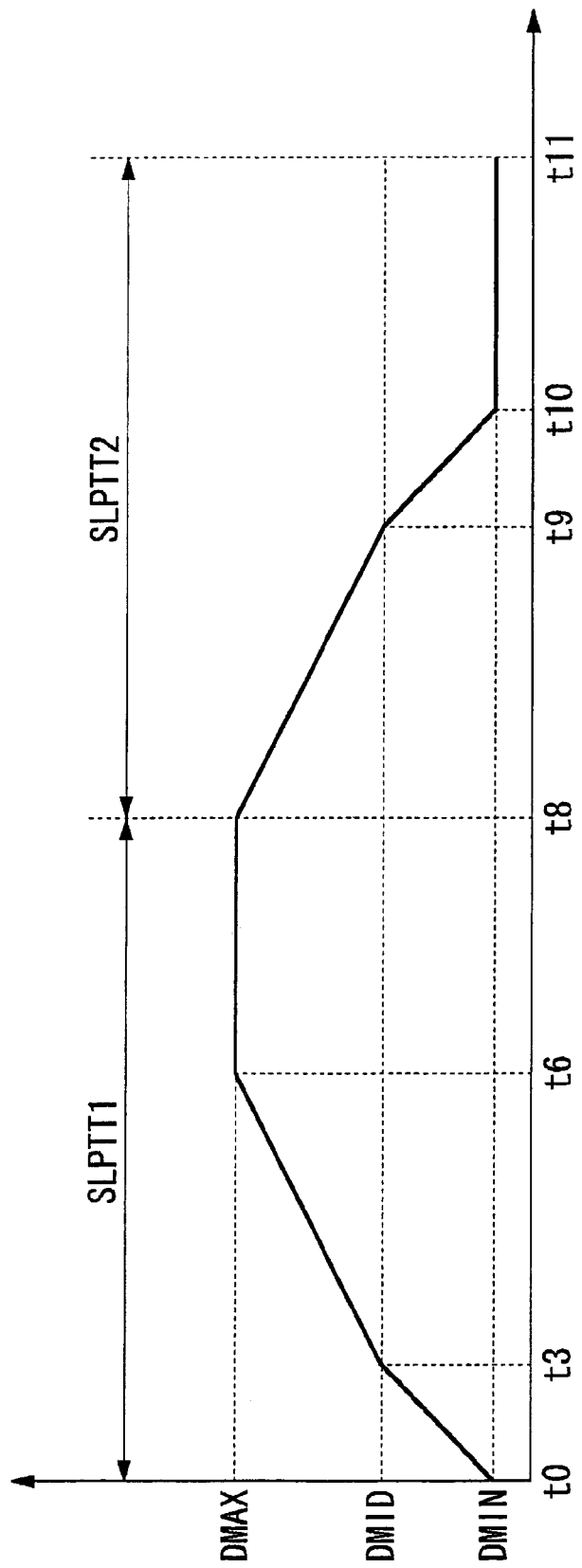
FIG. 11 is a graph showing an example of change with time of pulse signals outputted when the emission control processing is being carried out.

FIG. 11 is a graph showing an example of change with time of pulse signals outputted when the first emission control processing is being carried out. In this graph shown in FIG. 11, the vertical axis indicates PWMSET values, and the horizontal axis indicates time. In FIG. 11, the period between time t0 and time t11 corresponds to the emission control processing; the period between time t0 and time t8 corresponds to the first emission control processing; and the period between time t8 and time t11 coresponda to the second emission control processing. Time t0, time t3, time t6 and time t8 shown in FIG. 11 correspond respectively to those with the same numerals as in FIGS. 10A and 10B.

In the period, between time t8 and time t9, during which the pulse width changes from the DMAX value to the DMID value, an XCNT signal with a pulse width that decreases by 1 per cycle $T_{PWM}$ of the SLPDT3 value is outputted. Similarly, in the period, between time t9 and time t10, during which the pulse width changes from the DMID value to the DMIN value, an XCNT signal with a pulse width that decreases by 1 per cycle $T_{PWM}$ of the SLPDT4 value is outputted. When the pulse width reaches the DMIN value, that is, during the period between time t10 and time t11, an XCNT signal with a pulse width of a MIN value is outputted. In FIG. 11, SLPTT1 corresponds to the period between time t0 and time t8 and SLPTT2 corresponds to the period between time t8 and time t11.

In this manner, the present embodiment realizes by software not only the generation of the XCNT signal which is a pulse signal but also the setting of various parameters that relate to controlling the light emission of LEDs. Thus, the provision of an oscillation circuit for generating XCNT signals which are pulse signals will not be required in particular, so that a compact and light-weight drive control circuit is realized. Moreover, the setting or change of the parameters can realizes diverse ways of controlling the light emission of LEDs, thus being superior in terms of ease of operation and flexibility. Moreover, if a unit variation of pulse width is fixed and the period of the same pulse width such as SLPDT1 is variably set, then the slope of lines in FIG. 11, for example, can be set individually. As a result, the light emission of LEDs can be achieved more naturally in the human sensory level.

Hence, an expressive light emission control can be achieved with relative ease and flexibility.

SECOND EMBODIMENT

In the first embodiment, the first PWM circuit 134a, the second PWM circuit 134b and the third PWM circuit 134c control individually the respective above-described emission control processings relating to the first LED 26a, the second LED 26b and the third LED 26c. In a second embodiment, in contrast thereto, emission control periods for a plurality of LEDs are mutually synchronized and whether or not to carry out an emission control processing for each LED is determined and controlled accordingly, so that the color tone of an emitted color realized by a plurality of LEDs is controlled.

Figure 12:
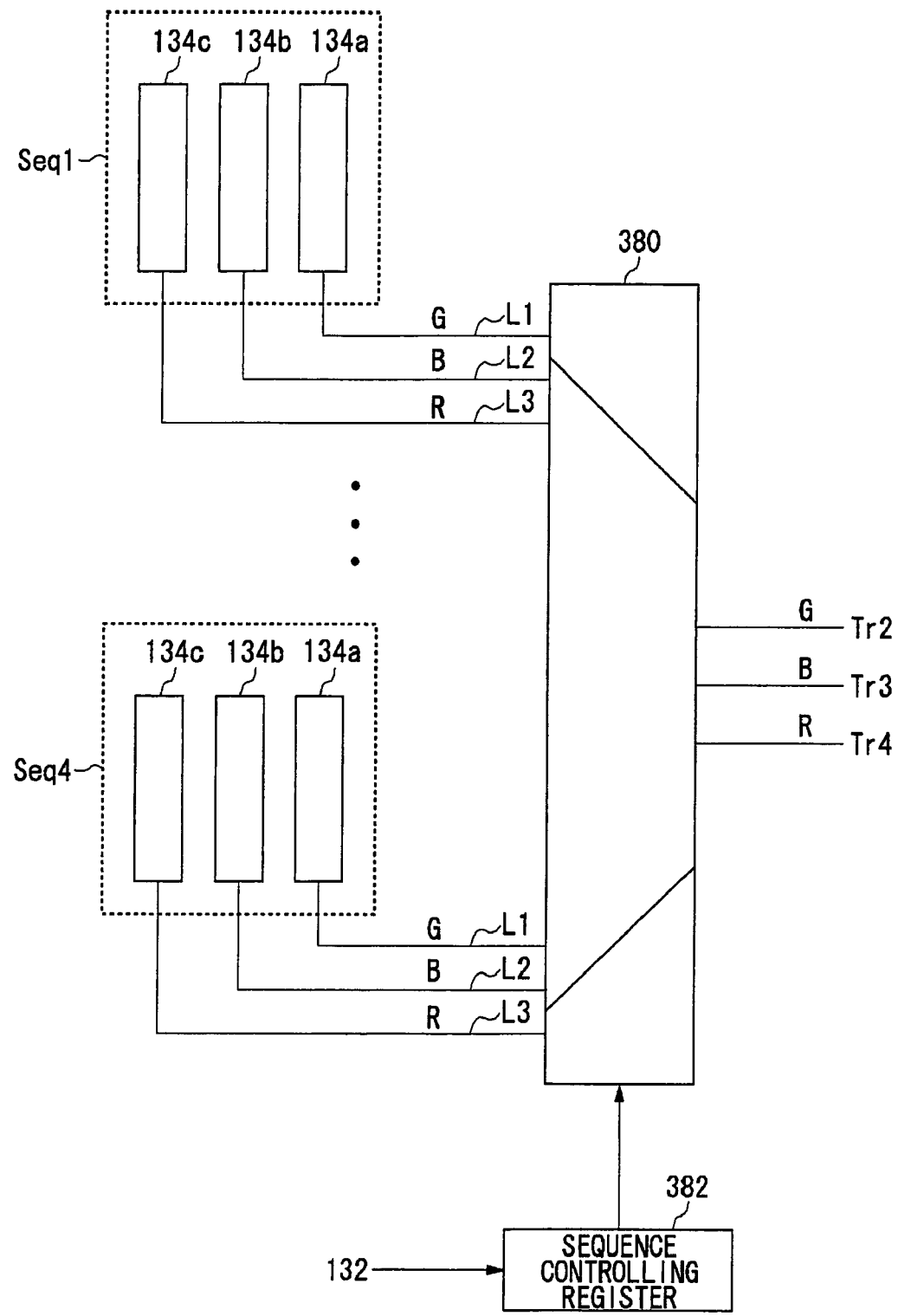
FIG. 12 illustrates a structure of a drive control circuit according to a second embodiment of the present invention.

FIG. 12 illustrates a structure of a drive control circuit 136 according to a second embodiment of the present invention. Here, component parts other than a communication apparatus with an image-taking function 10 and the drive control circuit in the light emitting unit 14 are similar to those described in the first embodiment. The drive control circuit 136 according to the second embodiment has four sequence control circuits Seq1 to Seq4, a selector circuit 380 and a sequence control register 382 of 3 bits. Each of the four sequence control circuits Seq1 to Seq4 has a first PWM circuit 134a, a second PWM circuit 134b and a third PWM circuit 134c that control a first LED 26a emitting green light, a second LED 26b emitting blue light and a third LED 26c emitting red light, respectively. The first PWM circuit 134a, the second PWM circuit 134b and the third PWM circuit 134c according to the second embodiment have structures similar to those of the first PWM circuit 134a, the second PWM circuit 134b and the third PWM circuit 134c according to the first embodiment. The first PWM circuit 134a, the second PWM circuit 134b and the third PWM circuit 134c are connected to the selector circuit 380 via a first signal line L1, a second signal line L2 and a third signal line L3, respectively. In FIG. 12, output signals outputted from the PWM circuits 134 via the signal lines L1, L2 and L3, respectively are denoted by G, B, R, respectively, to facilitate the distinction among the output signals.

With one-time emission control processing as one unit control cycle, the selector circuit 380 selects, in a sequential order, the four sequence control circuits Seq1 to Seq4 per this cycle. The selector circuit 380 delivers, as output signals of the selector circuit 380, signals outputted from the thus selected control circuits to the first LED 26a, the second LED 26b and the third LED 26c via a transistor Tr1, a transistor Tr2, a transistor Tr3 and a transistor Tr4, respectively. After the selector circuit 380 has selected the sequence control circuit Seq4, it repeats this selection processing to select again the sequence control circuit Seq1.

The first PWM circuit 134a, the second PWM circuit 134b and the third PWM circuit 134c determine respectively whether or not to carry out the above-described emission control processing, in accordance with predetermined values set in the sequence control register 382. For example, if a binary parameter of "001" is set to the sequence control register 382, then the first PWM circuit 134a, the second PWM circuit 134b and the third PWM circuit 134c, which are associated to the respective digits, will carry out the emission control processing when the corresponding value is "1" and will not carry out the emission control processing when the value is "0".

Figure 13A:
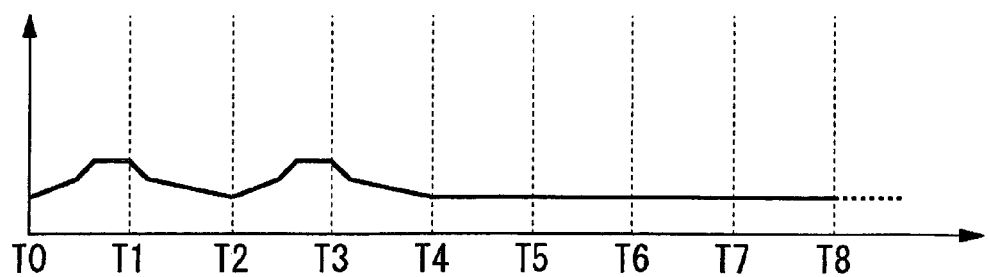
FIG. 13A is a graph showing an example of change with time of pulse signals for a first LED outputted from a first PWM circuit.
Figure 13B:
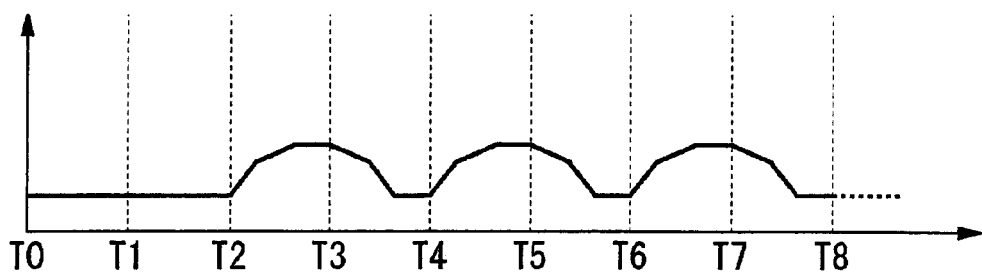
FIG. 13B is a graph showing an example of change with time of pulse signals for a second LED outputted from a second PWM circuit.
Figure 13C:
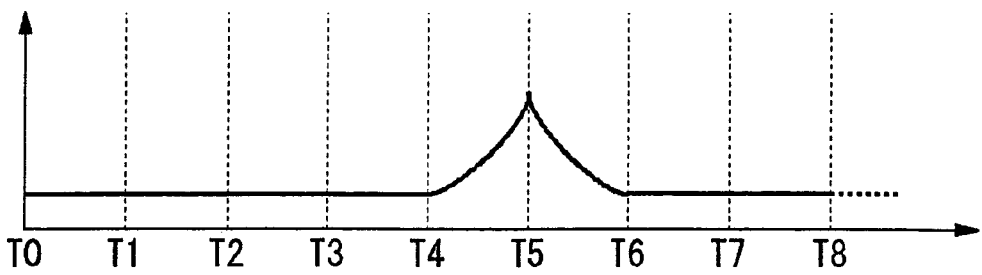
FIG. 13C is a graph showing an example of change with time of pulse signals for a third LED outputted from a third PWM circuit.

FIG. 13A is a graph showing an example of change with time of pulse signals for the first LED 26a outputted from the first PWM circuit 134a. FIG. 13B is a graph showing an example of change with time of pulse signals for the second LED 26b outputted from the second PWM circuit 134b. FIG. 13C is a graph showing an example of change with time of pulse signals for the third LED 26c outputted from the third PWM circuit 134c. In FIGS. 13A, 13B and 13C, for example, the period between time T0 and time T1 corresponds to the first emission control processing, the period between time T1 and time T2 corresponds to the second emission control processing and the period between time T0 and time T2 corresponds to one emission control processing, namely, one unit control cycle.

When the binary parameter of "001" is set at time T0 and, the first PWM circuit 134a, the second PWM circuit 134b and the third PWM circuit 134c correspond to each of the digits "001" in the order of from right to left, the first PWM circuit 134a carries out the emission control processing in the period between time T0 and time T2 and the other second PWM circuit 134b and the third PWM circuit 134c do not carry out the emission control processing, as shown in FIGS. 13A, 13B and 13C. In this manner, by merely setting predetermined values to the sequence control register 382 on software, whether or not to carry out the emission control processing for a plurality of LED elements can be set. Moreover, periods such as SLPTT1 and SLPTT2 for emission control processings are provided and the periods of emission control processings among a plurality of LED elements are synchronized, so that tone of an emitted color can be controlled. Moreover, such the control of color tone can be executed by merely setting or changing the parameters on software, thus being superior in terms of ease of operation and flexibility.

Next, an exemplary correspondence between the prevent invention and the above-described embodiments will be described. An "initial-value setting circuit" corresponds to the PWM setting register 302, for example. A "time setting circuit" corresponds to the first slope register 352, the second slope register 354, the third slope register 364, the forth slope register 366, for example. A "slope control circuit" corresponds to the PWM output counter 304, for example. A "total time setting circuit" corresponds to the first total time register 356 and the second total time register 368, for example. A "sequence control unit" corresponds to the sequence control register 382, for example.

The present invention has been described based on the embodiments which are only exemplary. It is understood by those skilled in the art that there exist other various modifications to the combination of each component and process described above and that such modifications are encompassed by the scope of the present invention which is defined by the appended claims.

The emission control processing according to the present embodiments has the second slope period and the third slope period. However, when the first emission control processing period is shorter than the first slope period, the pulse width reaches the DMAX value during the first slope period. In such a case, the emission control processing is not carried out in the second slope period and the third slope period, and the emission control processing is carried out in the fourth slope period after carrying out the emission control processing in the first slope period. As a result, the emission control of LED elements can be realized in a flexible manner.

The colors of the LED elements in the present embodiments are three primary colors, namely, blue, green and red colors, but the colors to be used are not limited thereto. For example, the combination of two colors or the combination of three or more colors may be used.

What is claimed is:

1. A drive control circuit, comprising:
   an initial-value setting circuit which sets an initial value of pulse width when a load is driven using pulse-width modulation;
   a time setting circuit which sets a period during which the pulse width does not vary; and
   a slope control circuit which varies the pulse width gradually in units of minimum modulation every time the period elapses.

2. A drive control circuit according to claim 1, wherein the period is set by a multiple of cycle of the pulse width modulation.

3. A drive control circuit according to claim 2, further comprising a total time setting circuit which sets a period of time during which the pulse width varies.

4. A drive control circuit according to claim 3, wherein the period of time during which the pulse width varies is set as a unit control cycle, further comprising a sequence control unit which controls and determines whether or not to carry out an emission control processing for varying the pulse width, per the unit control cycle.

5. A drive control circuit according to claim 1, further comprising a total time setting circuit which sets a period of time during which the pulse width varies.

6. A drive control circuit according to claim 5, wherein the period of time during which the pulse width varies is set as a unit control cycle, further comprising a sequence control unit which controls and determines whether or not to carry out an emission control processing for varying the pulse width, per the unit control cycle.

7. A drive control method characterized in that when a load is driven using pulse width modulation, a drive having a slope with respect to time is realized in a maimer such that a unit variation of pulse width is fixed and a period during which the pulse width does not vary is variably set.

8. A drive control method, comprising:
   when a plurality of loads are respectively driven using pulse width modulation, driving each of the plurality of loads with an independent pulse width which varies with respect to time in the course of a predetermined period of time;
   setting the predetemined period of time the same among the plurality of loads for driving the plurality of loads in a synchronized manner.

9. A drive control circuit adapted to generate a pulse signal using a pulse-width modulation which includes a period in which a pulse width of the pulse signal increases and a period in which the pulse width decreases, the drive control circuit comprising:
   a first time setting circuit which sets a first period during which the pulse width does not vary, asserting an output signal of the first time setting circuit every time the first period elapses;
   a second time setting circuit which sets a second period during which the pulse width does not vary, asserting an output signal of the second time setting circuit every time the second period elapses;
   a first total time setting circuit which sets a third period of time during which the pulse width increases;
   a second total time setting circuit which sets a fourth period of time during which the pulse width decreases;
   a first selector circuit which refers to an output of the first total time setting circuit and outputs an increment signal, the increment signal being asserted every time the output signal of the first time setting circuit is asserted in the course of the third period;
   a second selector circuit which refers to an output of the second total time setting circuit and outputs a decrement signal, the decrement signal being asserted every time the output signal of the second time setting circuit is asserted in the course of the fourth period;
   a pulse-width modulation setting register which receives an initial value of the pulse width and outputs a pulse width value corresponding to the pulse width, the pulse-width modulation setting register increasing the pulse width value by a predetermined amount every time the increment signal is asserted and decreasing the pulse width value by a predetermined amount every time the decrement signal is asserted; and
   a slope control circuit which generates the pulse signal which pulse width corresponds to the pulse width value.

10. A drive control circuit according to claim 9, wherein at least one of the first period and the second period is set by a multiple of cycle of the pulse-width modulation.

11. A device control circuit according to claim 10, wherein at least one of the third period and the fourth period is set as a unit control cycle, further comprising a sequence control unit which controls and determines whether or not to carry out an emission control processing for varying the pulse width, per the unit control cycle.

12. A device control circuit according to claim 9, wherein at least one of the third period and the fourth period is set as a unit control cycle, further comprising a sequence control unit which controls and determines whether or not to carry out an emission control processing for varying the pulse width, per the unit control cycle.

13. A drive control method adapted to generate a pulse signal using a pulse-width modulation which includes a period in which a pulse width of the pulse signal increases and a period in which the pulse width decreases, the drive control method comprising the steps of: setting an initial value of the pulse width, a first period during which the pulse width does not vary, a second period during which the pulse width does not vary, a third period of time during which the pulse width increases and a fourth period of time during which the pulse width decreases; increasing the pulse width by a unit of minimum modulation every time the first period elapses in the course of the third period; and decreasing the pulse width by a unit of minimum modulation every time the second period elapses in the course of the fourth period.

14. A drive control circuit adapted to generate a pulse signal using a pulse-width modulation which includes a period in which a pulse width of the pulse signal increases and a period in which the pulse width decreases, the drive control circuit comprising:
   a first time setting circuit which sets a first period during which the pulse width does not vary, asserting an output signal of the first time setting circuit every time the first period elapses;
   a second time setting circuit which sets a second period during which the pulse width does not vary, asserting an output signal of the second time setting circuit every time the second period elapses;
   a third time setting circuit which sets a third period during which the pulse width does not vary, asserting an output signal of the third time setting circuit every time the third period elapses;
   a fourth time setting circuit which sets a fourth period during which the pulse width does not vary, asserting an output signal of the fourth time setting circuit every time the fourth period elapses;
   a minimum-value setting register which receives a minimum pulse width; a maximum-value setting register which receives a maximum pulse width; a first mid-value setting register which receives a first intermediate pulse width which lies between the minimum pulse width and the maximum pulse width;

a second mid-value setting register which receives a second intermediate pulse width which lies between the minimum pulse width and the maximum pulse width;

a first comparator which compares the pulse width and the first intermediate pulse width; a second comparator which compares the pulse width and the maximum pulse width;

a third comparator which compares the pulse width and the second intermediate pulse width;

a fourth comparator which compares the pulse width and the minimum pulse width;

a first total time setting circuit which sets a fifth period of time during which the pulse width increases;

a second total time setting circuit which sets a sixth period of time during which the pulse width decreases;

a first selector circuit which refers to an output of the first comparator, an output of the second comparator and an output of the first total time setting circuit and outputs an increment signal, the increment signal being asserted every time the output signal of the first time setting circuit is asserted in the course of the fiflh period in the case where the pulse width is narrower than the first intermediate pulse width, the increment signal being asserted every time the output signal of the third time setting circuit is asserted in the course of the fiflh period in the case where the pulse width is wider than or equal to the first intermediate pulse width;

a second selector circuit which refers to an output of the third comparator, an output of the fourth comparator and an output of the second total time setting circuit and outputs an decrement signal, the decrement signal being asserted every time the output signal of the second time setting circuit is asserted in the course of the sixth period in the case where the pulse width is wider than the second intermediate pulse width, the decrement signal being asserted every time the output signal of the fourth time setting circuit is asserted in the course of the sixth period in the case where the pulse width is narrower than or equal to the second intermediate pulse width;

a pulse-width modulation setting register which receives an initial value of the pulse width and outputs a pulse width value corresponding to the pulse width, the pulse-width modulation setting register increasing the pulse width value by a predetermined amount every time the increment signal is asserted and decreasing the pulse width value by a predetermined amount every time the decrement signal is asserted; and a slope control circuit which generates the pulse signal which pulse width corresponds to the pulse width value.

15. A drive control circuit according to claim 14, wherein at least one of the first period, the second period, the third period and the fourth period is set by a multiple of cycle of the pulse-width modulation.

16. A device control circuit according to claim 15, wherein at least one of the fiflh period and the sixth period is set as a unit control cycle, further comprising a sequence control unit which controls and determines whether or not to carry out an emission control processing for varying the pulse width, per the unit control cycle.

17. A device control circuit according to claim 14, wherein at least one of the fiflh period and the sixth period is set as a unit control cycle, further comprising a sequence control unit which controls and determines whether or not to carry out an emission control processing for varying the pulse width, per the unit control cycle.

18. A drive control method adapted to generate a pulse signal using a pulse-width modulation which includes a period in which a pulse width of the pulse signal increases and a period in which the pulse width decreases, the drive control method comprising the steps of:

setting an initial value of the pulse width, a first period during which the pulse width does not vary, a second period during which the pulse width does not vary, a third period during which the pulse width does not vary, a fourth period during which the pulse width does not vary, a minimum pulse width, a maximum pulse width, a first intermediate pulse width which lies between the minimum pulse width and the maximum pulse width, a second intermediate pulse width which lies between the minimum pulse width and the maximum pulse width, a fiflh period of time during which the pulse width increases and a sixth period of time during which the pulse width decreases;

increasing the pulse width by a unit of minimum modulation every time the first period elapses in the course of the fiflh period in the case where the pulse width is narrower than the first intermediate pulse width and every time the third period elapses in the course of the fiflh period in the case where the pulse width is wider than or equal to the first intermediate pulse width; and decreasing the pulse width by a unit of minimum modulation every time the second period elapses in the course of the sixth period in the case where the pulse width is wider than the second intermediate pulse width and every time the fourth period elapses in the course of the sixth period in the case where the pulse width is narrower than or equal to the second intermediate pulse width.

* * * * *